United States Patent [19]

Bambara et al.

[11] Patent Number: 4,837,060
[45] Date of Patent: Jun. 6, 1989

[54] TUBING PLANK

[75] Inventors: John D. Bambara, Osterville; Jack P. Erceg, Marstons Mills, both of Mass.

[73] Assignee: Packaging Industries Group, Inc., Hyannis, Mass.

[21] Appl. No.: 99,901

[22] Filed: Sep. 22, 1987

[51] Int. Cl.$^4$ ............... B32B 3/20; B32B 3/22; B32B 3/26

[52] U.S. Cl. ............... 428/36.5; 428/166; 428/174; 428/178; 428/179; 428/188; 428/316.6; 428/906

[58] Field of Search ............ 428/36, 166, 174, 178, 428/179, 188, 316.6, 116, 119, 120

[56] References Cited

U.S. PATENT DOCUMENTS

| | | | |
|---|---|---|---|
| 2,369,006 | 2/1945 | Banks | 428/116 |
| 2,994,327 | 8/1961 | Otto et al. | 428/36 |

FOREIGN PATENT DOCUMENTS

| | | | |
|---|---|---|---|
| 57-58291 | 12/1982 | Japan | 428/188 |
| 18478 | 9/1901 | United Kingdom | 428/188 |
| 2184758 | 7/1987 | United Kingdom | 428/188 |

*Primary Examiner*—William J. Van Balen
*Attorney, Agent, or Firm*—Berman, Aisenberg & Platt

[57] ABSTRACT

A tubing plank is fabricated from foamed tubular members positioned parallel to and adjacent each other, the members having substantially coplanar longitudinal axes, and each member secured to each adjacent member along adjacent sidewalls to form a planar member. A sheet member may be applied to at least one face of the tubing plank, each sheet member forming a contact area. In another embodiment, tubular members are positioned parallel to and spaced apart from each other, adhered to at least one sheet member. A second sheet member may be adhered to the opposite face of the tubes from first sheet.

9 Claims, 1 Drawing Sheet

TUBING PLANK

FIELD OF THE INVENTION

The invention relates to cushioning and protective packaging materials.

BACKGROUND OF THE INVENTION

Foam tubing is known for use as pipe wrapping material, and foam sheet plastic material is known for use as cushioning material. Prior cushioning materials of the foamed sheet type have inadequate compression resistance, and other protective packaging materials, such as corrugated cardboard, have poor resilience compared with foamed material.

SUMMARY OF THE INVENTION

A tubing plank comprises a plurality of foamed plastic tubular membranes having parallel longitudinal axes and means for securing the tubular members to form a substantially coplanar structure. The tubes may be adjacent to each other and the plank formed by securing adjacent tubes along adjacent sidewalls to form a coplanar structure. The adjacent sidewalls are secured together either by heat-sealing or adhesively. A sheet member may be secured across a face of the plank, covering the tubular members, forming a contact area. Alternatively, the tubular members may be spaced apart from each other in parallel array, and secured to a sheet member. A second sheet member may be secured to an opposite face of a plank from the first sheet member, forming a second contact area substantially parallel to the first contact area. The tubular members are preferably of foamed plastic, and the sheet members may be of unfoamed or foamed plastic material, or other appropriate sheet material.

An object of the invention is to provide improved cushioning or protective packaging material.

DETAILED DESCRIPTION OF THE INVENTION

The tubing plank of the invention provides improved cushioning and protective packaging material which may be wound into rolls or cut and stacked as sheets, and used for forming into containers or for any other appropriate purpose.

Tubing plank cushioning material may be made by positioning lengths of foam tubular members adjacent each other and securing the tubes to each other along longitudinal seams, thereby providing a corrugated tubing plank. The foamed tubes may be secured or welded to each other by heat-sealing, adhesively by glueing, or by other methods known to one skilled in the art. The corrugated cushioned material so formed has a multitude of uses in wrapping fragile objects, or other uses in which cushioning material is required. This cushioning material may be strengthened by laminating a sheet of either foamed or unfoamed plastic material to one face of the material. To add further strength, a second sheet, similar to or different from the first sheet, may be secured to the opposite face of the corrugated material from the first sheet.

In another embodiment of the invention, individual tubes positioned parallel to and spaced apart from each other may be secured to a foamed or unfoamed sheet. A second sheet, which may be similar to or different from the first sheet, may be applied to the opposite face of the tubes from the first sheet, substantially parallel to the first sheet, providing a cushioning material having substantial strength and resilience.

Figure 1:
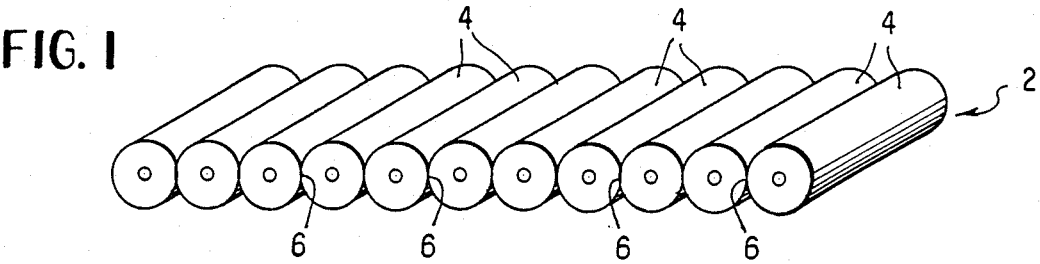
FIG. 1 is a perspective view of a tubing plank of the invention.

With reference to FIGS. 1 to 5, in which like numerals represent like parts, FIG. 1 shows a simple tubing plank 2 of the invention in which a plurality of tubular members 4 are positioned adjacent to each other, touching each other and secured together along a plurality of longitudinal seams 6. Longitudinal seam 6 may be a continuous seam or may be an intermittent or broken seam. Greater strength is obtained if the seam is continuous. Plank 2 may be wound into a roll or cut into lengths for transportation and storage.

Figure 2:
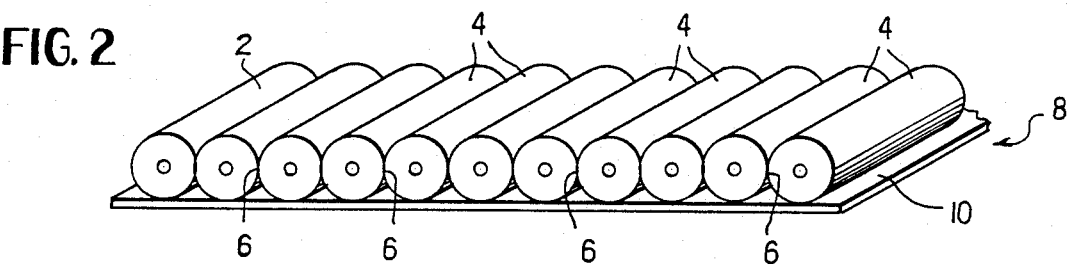
FIG. 2 is a perspective view of another tubing plank of the invention.

FIG. 2 shows a tubing plank 8 in which a sheet 10 is secured to one face of corrugated member, such as tubing plank 2 comprised of tubular members 4 (illustrated in FIG. 1). Sheet 10, which may be a foamed or unfoamed plastic sheet, is laminated to one face of tubing plank 2 forming a contact area. Sheet 10 may alternatively be paper, cardboard, textile fabric, felt or other material known to one skilled in the art, which provides corrugated cushioning or packaging material in combination with tubing plank 2. Sheet 10 is preferably foamed or unfoamed sheet plastic material. Sheet 10 may be a single sheet or may be composed of a plurality of sheets or strips as illustrated in FIG. 4 for a laminate having facing sheets on both sides.

Figure 3:
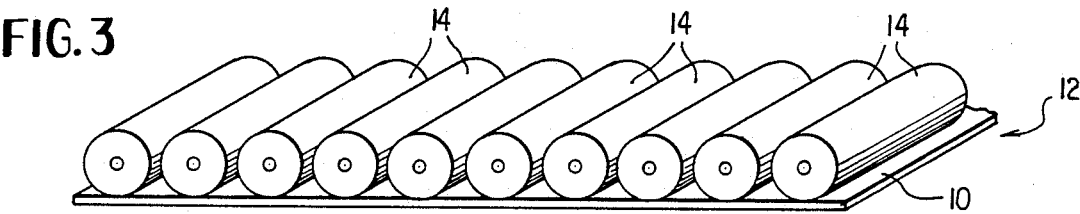
FIG. 3 is a perspective view of yet another tubing plank of the invention.

In another embodiment, shown in FIG. 3, laminate 12 is formed from individual tubes 14 which are spaced apart from each other by an amount sufficient to provide cushioning to an article by the laminate, and preferably also sufficient to allow laminate 12 to be wound into a roll for shipping and storage. Backing sheet 10, similar to that shown in FIG. 2, is preferably either foamed or unfoamed plastic material. Laminate 12 may be too inflexible to be wound into a roll if backing material 10 is stiff and/or tubular members 14 are spaced relatively close together without touching each other. Laminate 8 of FIG. 2 has improved stacking strength over laminate 12 of FIG. 3. These laminates may be used to make packaging having improved compression strength and resiliency due to the use of the foam tubular material.

Figure 4:
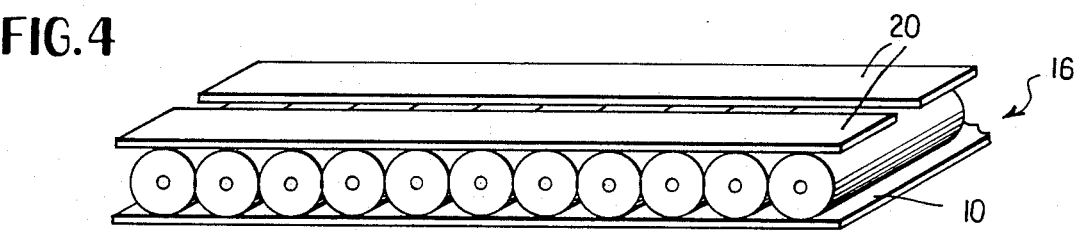
FIG. 4 is a perspective view of another embodiment of the tubing plank, in which facing sheets are adhered to each side of a tubing plank.
Figure 5:
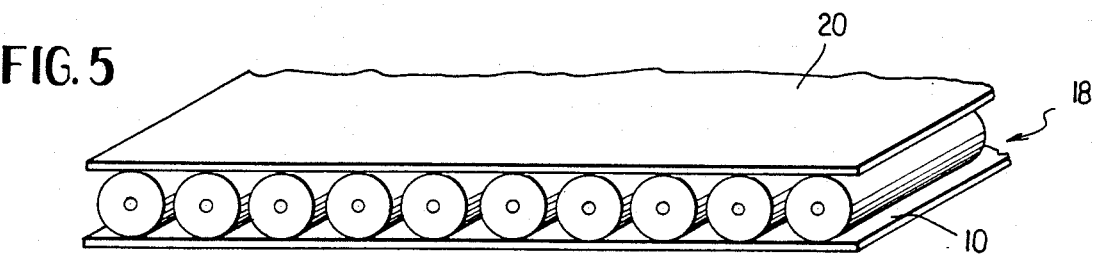
FIG. 5 is a perspective view of another embodiment of a tubing plank having facing sheets on each side.

FIGS. 4 and 5 show laminates 16 and 18 respectively, in which a second sheet 20 of foamed or unfoamed material is added to the laminate substantially parallel to backing sheet 10, on the diametrically opposite face of the tubular members, to form a two-faced laminate having tubular members separating the faces. The tubular members are either secured to, or spaced apart from each other, as shown in FIGS. 4 and 5, respectively. One or both of the sheets may be composed of a plurality of sheets or strips as illustrated in FIG. 4. The laminates of FIGS. 4 and 5 are used for making materials having improved compression strength and resiliency.

The tubing is preferably of foamed plastic material, for example, polyethylene foam, and the tubing may be of any appropriate length and cross-section according to use. In non-limiting examples, foam tubing may have a wall thickness of ⅜ in. to 1 in. and an outside diameter of 1 in. to 8 in. The material may have a density of 1 to 4 lb./cu. ft., depending on materials used and number of facing sheets, if any. The sheets laminated to the tubing planks may be of foamed or unfoamed plastic material, such as polyethylene, of about ⅛ in. to ¾ in. in thickness. When rows of tubes 14 are not joined to each other, but sealed to two facing sheets, as shown in FIG. 5, the material has strength characteristics of a rigid, foam board. Plank 18, shown in FIG. 5, is more than twice as stiff along the axis of the centers of the tube and also in the direction parallel to the faces and at right angles to the tube centers than board 12 of FIG. 3. Additionally, stacking strength of plank 18 is substantially improved over that of plank 12.

For some uses, the tubular members may be secured to strip members instead of sheets, over one or both of the faces of the tubes, as shown in FIG. 4. The tubes may be secured to such strips either adjacent to or spaced away from each other. Other means for securing tubes will be apparent to one skilled in the art.

While the invention has been described above with respect to certain embodiments thereof, it will be appreciated that variations and modifications may be made without departing from the spirit and scope of the invention.

What is claimed is:

1. A plank comprising a plurality of spaced apart foamed plastic tubular members positioned in substantially parallel array and at least one sheet means secured to the tubular members for forming a substantially planar structure.

2. A plank of claim 1 wherein the tubular members comprise foamed polyethylene.

3. A plank of claim 1 which is wound into rolls.

4. A plank of claim 1 wherein the tubular members comprise parallel tubular members.

5. A plank of claim 1 comprising first and second sheet means secured to opposite faces of said tubular members for forming contact areas, wherein said contact areas are substantially parallel to each other.

6. A plank of claim 1 wherein the sheet means comprises plastic material.

7. A plank of claim 6 wherein the plastic material comprises foamed plastic material.

8. A plank of claim 5 wherein at least one of said sheet means comprises plastic material.

9. A plank of claim 8 wherein the plastic material comprises foamed plastic material.

* * * * *